US012576686B2

(12) United States Patent
Chen et al.

(10) Patent No.: US 12,576,686 B2
(45) Date of Patent: Mar. 17, 2026

(54) HEAT MANAGEMENT SYSTEM AND ELECTRIC VEHICLE

(71) Applicant: Huawei Digital Power Technologies Co., Ltd., Shenzhen (CN)

(72) Inventors: Jun Chen, Dongguan (CN); Chaopeng Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 789 days.

(21) Appl. No.: 17/868,122

(22) Filed: Jul. 19, 2022

(65) Prior Publication Data

US 2022/0348051 A1 Nov. 3, 2022

Related U.S. Application Data

(63) Continuation of application No. PCT/CN2020/109075, filed on Aug. 14, 2020.

(30) Foreign Application Priority Data

Jan. 19, 2020 (CN) .......................... 202010062316.9

(51) Int. Cl.
  *B60H 1/00* (2006.01)
  *B60L 58/26* (2019.01)
  *H01M 10/66* (2014.01)
(52) U.S. Cl.
  CPC ..... *B60H 1/00278* (2013.01); *B60H 1/00392* (2013.01); *B60H 1/00885* (2013.01); *B60L 58/26* (2019.02); *H01M 10/66* (2015.04); *B60H 2001/00307* (2013.01)

(58) Field of Classification Search
  CPC ............ B60H 1/00278; B60H 1/00392; B60H 1/32284; B60K 11/02
  See application file for complete search history.

(56) References Cited

U.S. PATENT DOCUMENTS

2018/0208014 A1 7/2018 Ahmed et al.
2019/0176643 A1 6/2019 Sutherland et al.

FOREIGN PATENT DOCUMENTS

| CN | 103448728 A | 12/2013 |
| CN | 108725249 A | 11/2018 |
| CN | 110329113 A | 10/2019 |
| CN | 110385963 A | 10/2019 |

(Continued)

*Primary Examiner* — Jerry-Daryl Fletcher
*Assistant Examiner* — Keith Stanley Myers
(74) *Attorney, Agent, or Firm* — Maier & Maier, PLLC

(57) ABSTRACT

A heat management system and an electric vehicle. The heat management system may be configured in the electric vehicle. A plurality of heat management requirements are generated under different conditions such as different operating conditions (such as driving and a charging request) of the electric vehicle, a current ambient temperature of the electric vehicle, a temperature of a battery pack, or a heat status (that is, a heat value) of a power assembly. Therefore, the heat management system can select different circulation manners of a coolant for different heat management requirements. The heat management system adjusts opening or closing of each valve port in the multi-path direction control valve assembly to select different circulation manners of the coolant, to reduce energy consumption and costs generated when the heat management system performs heat management on the power assembly and the battery pack.

20 Claims, 10 Drawing Sheets

(56)             References Cited

FOREIGN PATENT DOCUMENTS

| | | | |
|---|---|---|---|
| CN | 209552867 | U | 10/2019 |
| CN | 111251823 | A | 6/2020 |
| DE | 102017126879 | A1 | 12/2018 |
| DE | 102018117099 | A1 | 1/2020 |
| WO | 2017038677 | A1 | 3/2017 |
| WO | 2019182079 | A1 | 9/2019 |
| WO | 2019211069 | A1 | 11/2019 |

HEAT MANAGEMENT SYSTEM AND ELECTRIC VEHICLE

CROSS-REFERENCE TO RELATED APPLICATIONS

This application is a continuation of International Application No. PCT/CN2020/109075, filed on Aug. 14, 2020, which claims priority to Chinese Patent Application No. 202010062316.9, filed on Jan. 19, 2020. The disclosures of the aforementioned applications are hereby incorporated by reference in their entireties.

TECHNICAL FIELD

The embodiments relate to the field of heat management technologies, a heat management system, and an electronic vehicle.

BACKGROUND

In comparison with a conventional fuel vehicle, an electric vehicle uses a battery as a power source, and therefore has features such as energy conservation and environmental protection. Currently, a pure electric vehicle is popularized in the market. In an actual application scenario, heat management generally needs to be performed on management objects such as a battery pack, a passenger compartment, and a power system (which may also be referred to as a power assembly) of the electric vehicle, so that temperatures of these management objects are maintained within an operating temperature range for normal operation. For example, the heat management includes cooling management and heating management. The power system may include, but is not limited to, an oil cooler, a motor, and a power component (such as an inverter).

In a related technology, a conventional heat management architecture solution of an electric vehicle is shown in FIG. 1. The conventional heat management solution is divided into three circulation parts based on endurance temperatures of three system ends of the battery pack, the passenger compartment, and the power assembly. Circulation 1 is heat dissipation circulation of the battery pack (an intake temperature of a low-temperature heat exchanger of a battery at a front end is about 30° C.). Circulation 2 is cooling circulation of the passenger compartment (an intake temperature of a condenser is about 40° C.). Circulation 3 is heat dissipation circulation of a power assembly loop (an intake temperature of a heat sink of the power assembly at a front end is about 45° C.).

In the foregoing heat management solution, the battery pack and the power assembly are divided into two different coolant circulation parts. As two independent circulation parts, the circulation 1 and the circulation 3 need two heat exchange systems. The two heat exchange systems have a single heat management manner.

SUMMARY

The embodiments provide a heat management system and an electric vehicle, to provide coolant circulation manners (that is, heat management manners) for different heat management requirements, thereby reducing energy consumption and costs generated when a system performs heat management on a power assembly and a battery pack.

On this basis, according to a first aspect, an embodiment provides a heat management system (which may be referred to as a system for short hereinafter). The system includes a vapor compression circulation subsystem and a coolant subsystem. A compressor, a condenser, a throttling apparatus, and an evaporator that are included in the vapor compression circulation subsystem are sequentially connected to form a closed loop, to provide a coolant at a preset temperature for circulation in the coolant subsystem. A battery pack, a power assembly, a heat exchanger, a first water pump, a second water pump, a third water pump, a first water tank, and a second water tank that are included in the coolant subsystem are connected by using a multi-path direction control valve assembly, so that the system adjusts opening or closing of each valve port in the multi-path direction control valve assembly to select different circulation manners of the coolant.

In the foregoing implementation, the coolant subsystem connects the battery pack, the power assembly, the heat exchanger, the first water pump, the second water pump, the third water pump, the first water tank, and the second water tank by using the multi-path direction control valve assembly, so that the system can adjust opening or closing of each valve port in the multi-path direction control valve assembly to select different circulation manners of the coolant. Heat management manners are provided for different heat management requirements, to reduce energy consumption and costs generated when the system performs heat management on the power assembly and the battery pack.

With reference to a first implementation of the first aspect of this embodiment, the system may further include a control subsystem. The control subsystem is configured to control the multi-path direction control valve assembly to implement circulation of the coolant among the condenser, the evaporator, the battery pack, the power assembly, the heat exchanger, the first water pump, the second water pump, the third water pump, the first water tank, and the second water tank.

In the foregoing implementation, the following is described: The system may further include more subsystems, for example, the control subsystem. The control subsystem controls the multi-path direction control valve assembly to implement different circulation manners of the coolant.

With reference to a second implementation of the first aspect of this embodiment, the control subsystem is configured to control the multi-path direction control valve assembly to implement three-path circulation of the coolant. The coolant on a first path of the three-path circulation is output from the condenser; sequentially flows through the first water pump, the heat exchanger, and the second water tank; and then is input to the condenser. The coolant on a second path of the three-path circulation is output from the condenser; sequentially flows through the first water pump, the heat exchanger, the second water pump, and the power assembly; and then is input to the condenser. The coolant on a third path of the three-path circulation is output from the evaporator; sequentially flows through the third water pump, the battery pack, and the first water tank; and then is input to the evaporator.

With reference to a third implementation of the first aspect of this embodiment, the control subsystem is further configured to control the multi-path direction control valve assembly, so that the coolant is output from the condenser; sequentially flows through the first water pump, the battery pack, the first water tank, the evaporator, the third water pump, the power assembly, the heat exchanger, and the second water tank; and then is input to the condenser.

With reference to a fourth implementation of the first aspect of this embodiment, the control subsystem is further configured to control the multi-path direction control valve assembly to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the heat exchanger, the second water pump, the power assembly, and the first water tank; and then is input to the evaporator.

With reference to a fifth implementation of the first aspect of this embodiment, the control subsystem is further configured to control the multi-path direction control valve assembly to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the power assembly, and the first water tank; and then is input to the evaporator.

With reference to a sixth implementation of the first aspect of this embodiment, the control subsystem is further configured to control the multi-path direction control valve assembly to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the power assembly, the heat exchanger, and the first water tank; and then is input to the evaporator.

With reference to a seventh implementation of the first aspect of this embodiment, the control subsystem is further configured to control the multi-path direction control valve assembly to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the heat exchanger, and the first water tank; and then is input to the evaporator.

In the foregoing implementation, how the control subsystem controls opening or closing of each valve port to select different circulation manners for the coolant is flexibly described.

With reference to an eighth implementation of the first aspect of this embodiment, a manner in which the battery pack, the power assembly, the heat exchanger, the first water pump, the second water pump, the third water pump, the first water tank, and the second water tank that are included in the coolant subsystem are connected by using the multi-path direction control valve assembly may be as follows: The first water tank, the second water tank, and the battery pack are respectively connected to a left valve port, a lower valve port, and a right valve port of a first multi-path direction control valve of the multi-path direction control valve assembly. The first water pump, an upper valve port of a fifth multi-path direction control valve of the multi-path direction control valve assembly, and a left valve port of a third multi-path direction control valve of the multi-path direction control valve assembly are respectively connected to a left valve port, a lower valve port, and a right valve port of a second multi-path direction control valve of the multi-path direction control valve assembly. The battery pack and an upper valve port of an eighth multi-path direction control valve of the multi-path direction control valve assembly are respectively connected to a right valve port and a lower valve port of the third multi-path direction control valve. The second water tank, the power assembly, and a right valve port of the fifth multi-path direction control valve are respectively connected to a left valve port, a right valve port, and an upper valve port of a fourth multi-path direction control valve of the multi-path direction control valve assembly. A water inlet of the heat exchanger and an upper valve port of a ninth multi-path direction control valve of the multi-path direction control valve assembly are respectively connected to a left valve port and a lower valve port of the fifth multi-path direction control valve. The first water tank, the second water tank, a water outlet of the heat exchanger, and the second water pump are respectively connected to an upper valve port, a left valve port, a right valve port, and a lower valve port of a sixth multi-path direction control valve of the multi-path direction control valve assembly. The power assembly, the second water pump, and a right valve of the eighth multi-path direction control valve are respectively connected to a right valve port, an upper valve port, and a left valve port of a seventh multi-path direction control valve of the multi-path direction control valve assembly. A right valve port of the ninth multi-path direction control valve is connected to a left valve port of the eighth multi-path direction control valve. The third water pump is connected to a left valve port of the ninth multi-path direction control valve.

In the foregoing implementation, a connection relationship between the system and the multi-path direction control valve assembly is provided. This is operable.

With reference to a ninth implementation of the first aspect of this embodiment, the system may further include a sensing subsystem. The sensing subsystem is configured to obtain a heat parameter (for example, a temperature or a heat value) of a target object (for example, one or more of the battery pack, the power assembly, or an environment in which the system is located). In this case, the control subsystem may be further configured to: receive the heat parameter sent by the sensing subsystem, and control, based on the heat parameter, opening or closing of a valve port of each multi-path direction control valve of the multi-path direction control valve assembly.

In the foregoing implementation, the system may further include more subsystems, for example, the sensing subsystem configured to obtain the heat parameter. In this way, the control subsystem determines, based on the heat parameter, a current corresponding heat management requirement, to control opening or closing of each valve port in a multi-path direction control valve to select a corresponding coolant circulation manner.

With reference to a tenth implementation of the first aspect of this embodiment, the sensing subsystem is configured to obtain a first temperature of the battery pack and a second temperature of the environment in which the system is located.

With reference to an eleventh implementation of the first aspect of this embodiment, the control subsystem is further configured to: when the control subsystem determines that the received first temperature is greater than a first preset temperature and the received second temperature is greater than a second preset temperature, control the left valve port, the right valve port, and the lower valve port of the first multi-path direction control valve to respectively be in a closed state, an open state, and the open state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the closed state, the open state, and the open state; control the left valve port, the right valve port, and the lower valve port of the fourth multi-path direction control valve to respectively be in the open state, the open state, and the closed state; control the left valve port, the upper valve port, the right valve port, and the lower valve port of the fifth multi-path direction control valve to respectively be in the open state, the open state, the open state, and the closed state; control the left valve port, the upper valve port, the right valve port, and the lower valve port of the sixth multi-path direction control valve to respectively be in the closed state, the open state, the open state, and the open state; control the left valve port, the upper valve port, and the right valve port of the seventh multi-path direction control valve to respectively be in the closed state, the open state, and the open state; control the left valve port, the upper valve port, and the right valve port of the eighth multi-path direction control valve to respectively be in the open state, the open state, and the closed state; and control the left valve port, the upper valve port, and the right valve port of the ninth multi-path direction control valve to respectively be in the open state, the closed state, and the open state.

In the foregoing implementation, an implementation how the control subsystem controls opening or closing of a valve port of each multi-path direction control valve of the multi-path direction control valve assembly is described when different heat parameters are obtained. This is flexible.

With reference to a twelfth implementation of the first aspect of this embodiment, the control subsystem is further configured to: when the control subsystem determines that the received first temperature is greater than a first preset temperature and the received second temperature is less than a second preset temperature, control the left valve port, the right valve port, and the lower valve port of the first multi-path direction control valve to respectively be in a closed state, an open state, and the open state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the open state, the open state, and the closed state; control the left valve port, the right valve port, and the lower valve port of the fourth multi-path direction control valve to respectively be in the open state, the open state, and the closed state; control the left valve port, the upper valve port, the right valve port, and the lower valve port of the fifth multi-path direction control valve respectively to the open state, the closed state, the open state, and the closed state; control the left valve port, the upper valve port, the right valve port, and the lower valve port of the sixth multi-path direction control valve to respectively be in the closed state, the open state, the open state, and the closed state; control the left valve port, the upper valve port, and the right valve port of the seventh multi-path direction control valve to respectively be in the open state, the closed state, and the open state; control the left valve port, the upper valve port, and the right valve port of the eighth multi-path direction control valve to respectively be in the open state, the closed state, and the open state; and control the left valve port, the upper valve port, and the right valve port of the ninth multi-path direction control valve to respectively be in the open state, the closed state, and the open state.

In the foregoing implementation, another implementation how the control subsystem controls opening or closing of a valve port of each multi-path direction control valve of the multi-path direction control valve assembly is described when different heat parameters are obtained. This is flexible.

With reference to a thirteenth implementation of the first aspect of this embodiment, the sensing subsystem is further configured to obtain a heat value of the power assembly.

With a fourteenth implementation of the first aspect of this embodiment, the control subsystem is further configured to: when the control subsystem determines that the received first temperature is less than a third preset temperature, the received second temperature is greater than the second preset temperature, and the heat value is less than a first preset value, control the left valve port, the right valve port, and the lower valve port of the first multi-path direction control valve to respectively be in the open state, the open state, and the closed state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the open state, the open state, and the closed state; control the left valve port, the right valve port, and the lower valve port of the fourth multi-path direction control valve to respectively be in the open state, the closed state, and the open state; control the left valve port, the upper valve port, the right valve port, and the lower valve port of the fifth multi-path direction control valve to respectively be in the open state, the closed state, the closed state, and the open state; control the left valve port, the upper valve port, the right valve port, and the lower valve port of the sixth multi-path direction control valve to respectively be in the closed state, the closed state, the open state, and the open state; control the left valve port, the upper valve port, and the right valve port of the seventh multi-path direction control valve to respectively be in the closed state, the open state, and the open state; and control the left valve port, the upper valve port, and the right valve port of the ninth multi-path direction control valve to respectively be in the open state, the open state, and the closed state.

In the foregoing implementation, another implementation how the control subsystem controls opening or closing of a valve port of each multi-path direction control valve of the multi-path direction control valve assembly is described when different heat parameters are obtained. This is flexible.

With reference to a fifteenth implementation of the first aspect of this embodiment, the control subsystem is further configured to: when the control subsystem determines that the received first temperature is less than a third preset temperature, the second temperature is less than the second preset temperature, and the heat value is greater than a first preset value and less than a second preset value, control the left valve port, the right valve port, and the lower valve port of the first multi-path direction control valve to respectively be in the open state, the open state, and the closed state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the open state, the open state, and the closed state; control the left valve port, the right valve port, and the lower valve port of the fourth multi-path direction control valve to respectively be in the closed state, the open state, and the open state; control the left valve port, the upper valve port, and the right valve port of the seventh multi-path direction control valve to respectively be in the open state, the closed state, and the open state; control the left valve port, the upper valve port, and the right valve port of the eighth multi-path direction control valve to respectively be in the open state, the closed state, and the open state; and control the left valve port, the upper valve port, and the right valve port of the ninth multi-path direction control valve to respectively be in the open state, the closed state, and the open state.

In the foregoing implementation, another implementation how the control subsystem controls opening or closing of a valve port of each multi-path direction control valve of the multi-path direction control valve assembly is described when different heat parameters are obtained. This is flexible.

With reference to a sixteenth implementation of the first aspect of this embodiment, the control subsystem is further configured to: when the control subsystem determines that the received first temperature is less than a third preset temperature and the heat value is greater than a second preset temperature, control the left valve port, the right valve port, and the lower valve port of the first multi-path direction control valve to respectively be in the open state, the open state, and the closed state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the open state, the open state, and the closed state; control the left valve port, the right valve port, and the lower valve port of the fourth multi-path direction control valve to respectively be in the open state, the open state, and the closed state; control the left valve port, the upper valve port, the right valve port, and the lower valve port of the fifth multi-path direction control valve to respectively be in the open state, the closed state, the open state, and the closed state; control the left valve port, the upper valve port, the right valve port, and the lower valve port of the sixth multi-path direction control valve to respectively be in the open state, the closed state, the open state, and the closed state; control the left valve port, the upper valve port, and the right valve port of the seventh multi-path direction control valve to respectively be in the open state, the closed state, and the open state; control the left valve port, the upper valve port, and the right valve port of the eighth multi-path direction control valve to respectively be in the open state, the closed state, and the open state; and control the left valve port, the upper valve port, and the right valve port of the ninth multi-path direction control valve to respectively be in the open state, the closed state, and the open state.

In the foregoing implementation, another implementation how the control subsystem controls opening or closing of a valve port of each multi-path direction control valve of the multi-path direction control valve assembly is described when different heat parameters are obtained. This is flexible.

With reference to a seventeenth implementation of the first aspect of this embodiment, the control subsystem is further configured to: when the control subsystem determines that the received first temperature is less than a fourth preset temperature and the heat value is less than an operating threshold, and the operating threshold is used to indicate a minimum heat value that needs to be reached when the power assembly operates, control the left valve port, the right valve port, and the lower valve port of the first multi-path direction control valve to respectively be in the open state, the open state, and the closed state; control the left valve port, the right valve port, and the lower valve port of the second multi-path direction control valve to respectively be in the open state, the open state, and the closed state; control the left valve port, the right valve port, and the lower valve port of the third multi-path direction control valve to respectively be in the open state, the open state, and the closed state; control the left valve port, the upper valve port, the right valve port, and the lower valve port of the fifth multi-path direction control valve to respectively be in the open state, the closed state, the closed state, and the open state; control the left valve port, the upper valve port, the right valve port, and the lower valve port of the sixth multi-path direction control valve to respectively be in the open state, the closed state, the open state, and the closed state; and control the left valve port, the upper valve port, and the right valve port of the ninth multi-path direction control valve to respectively be in the open state, the open state, and the closed state.

In the foregoing implementation, another implementation how the control subsystem controls opening or closing of a valve port of each multi-path direction control valve of the multi-path direction control valve assembly is described when different heat parameters are obtained. This is flexible.

With reference to the an eighteenth implementation of the first aspect of this embodiment, the sensing subsystem further includes a first sensor, a second sensor, and a third sensor. The first sensor is configured to obtain the first temperature of the battery pack. The second sensor is configured to obtain the heat value of the power assembly. The third sensor is configured to obtain the second temperature of the environment in which the system is located.

In the foregoing implementation, different heat parameters are obtained by different sensors.

According to a second aspect, an embodiment further provides an electric vehicle. The electric vehicle is configured with the heat management system according to the first aspect or any implementation of the first aspect of this embodiment. The electric vehicle configured with the heat management system is configured to provide coolant circulation manners (that is, heat management manners) for different heat management requirements, thereby reducing energy consumption and costs that are generated when the system performs heat management on a power assembly and a battery pack.

DETAILED DESCRIPTION OF THE EMBODIMENTS

The embodiments provide a heat management system and an electric vehicle, to provide coolant circulation manners (that is, heat management manners) for different heat management requirements, thereby reducing energy consumption and costs generated when a system performs heat management on a power assembly and a battery pack.

The following describes the embodiments with reference to accompanying drawings. A person of ordinary skill in this field may know that, with development of technologies and emergence of a new scenario, the solutions provided in the embodiments are also applicable to a similar problem.

In the embodiments and accompanying drawings, the terms "first", "second", and so on are intended to distinguish between similar objects but do not necessarily indicate an order or sequence. It should be understood that the terms used in such a way are interchangeable in proper circumstances, which is merely a discrimination manner that is used when objects having a same attribute are described in the embodiments. In addition, the terms "include", "contain" and any other variants mean to cover the non-exclusive inclusion, so that a process, method, system, product, or device that includes a series of units is not necessarily limited to those units but may include other units not expressly listed or inherent to such a process, method, product, or device.

Figure 1:
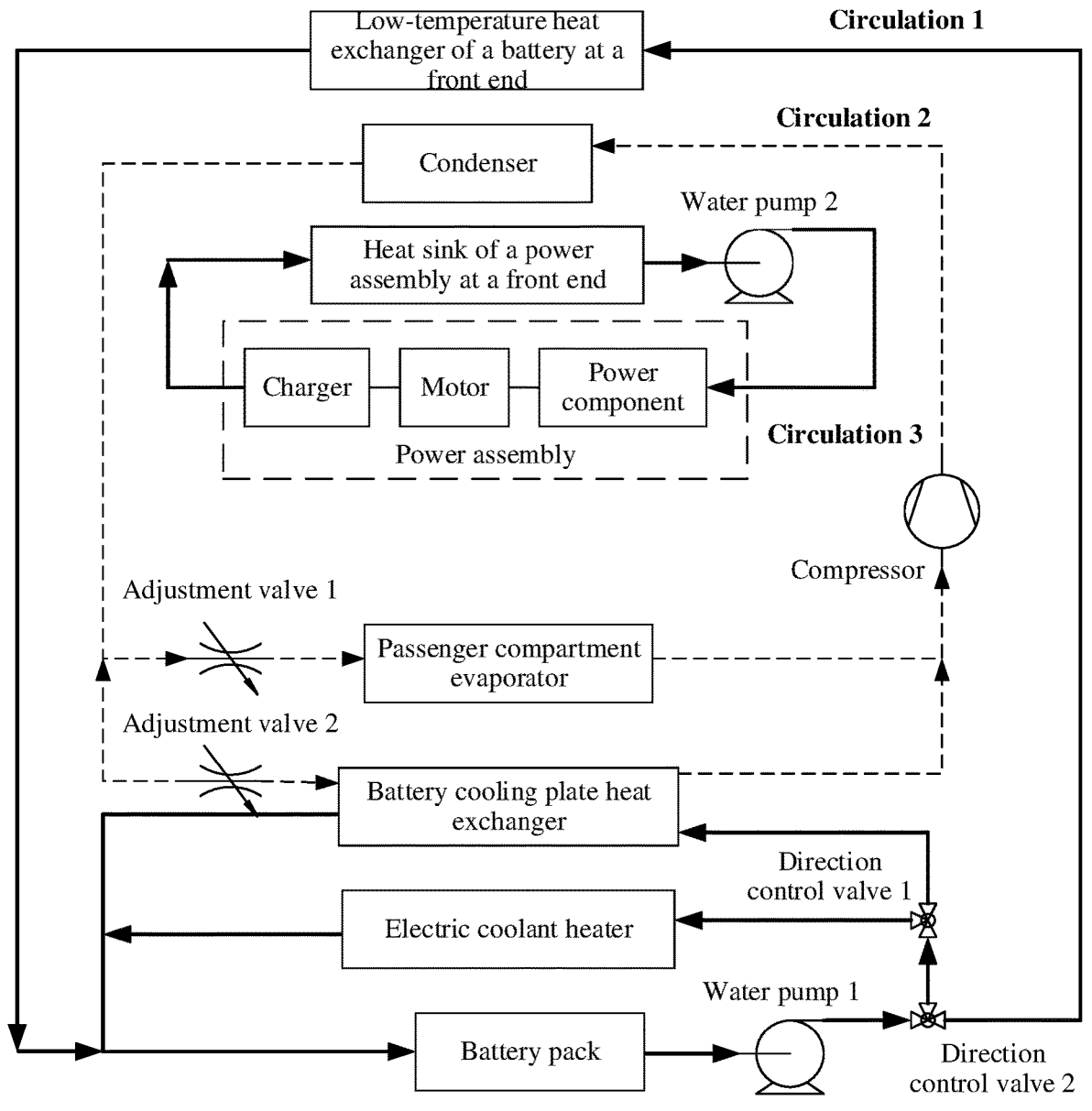
FIG. 1 is a schematic diagram of conventional heat management architecture of an electric vehicle.
Figure 2:
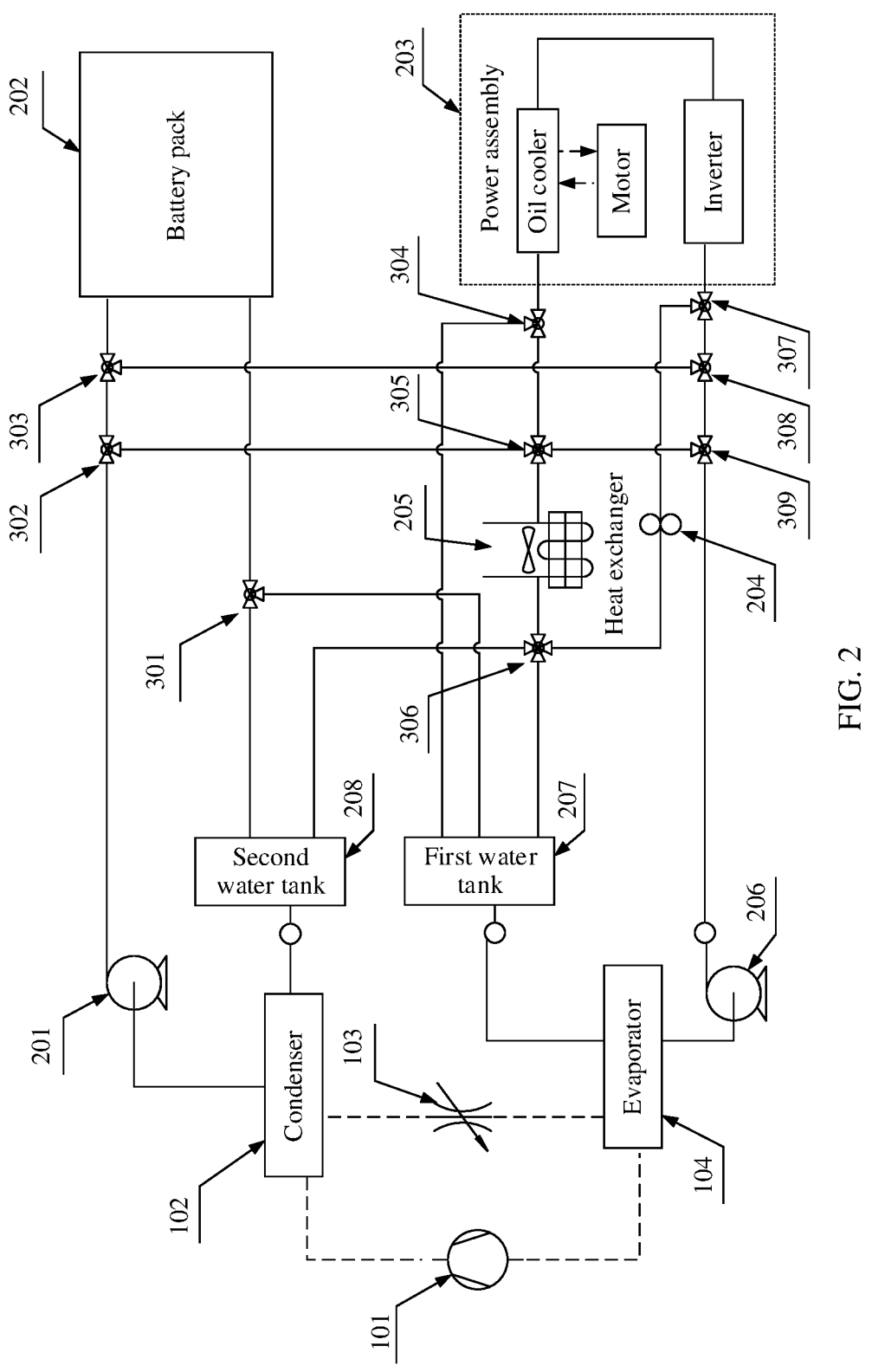
FIG. 2 is a schematic diagram of a frame structure of a heat management system.

First, the embodiments may provide a heat management system (hereinafter referred to as a system for short). For a framework of the system, refer to FIG. 2. The system includes a vapor compression circulation subsystem and a coolant subsystem. In FIG. 2, the vapor compression circulation subsystem is connected by using a dashed line. The subsystem includes, but is not limited to, the following components: a compressor 101, a condenser 102 (for example, a water condenser), a throttling apparatus 103 (for example, a regulating valve), and an evaporator 104 (for example, a water evaporator). The compressor 101, the condenser 102, the throttling apparatus 103, and the evaporator 104 are sequentially connected to form a closed loop shown by using the dashed line in FIG. 2. The vapor compression circulation subsystem is configured to: control a temperature and a velocity of a coolant in the condenser 102 and/or the evaporator 104, and then provide the coolant with a preset temperature to the coolant subsystem. For example, if the compressor 101 operates, the coolant circulates in the closed loop shown by using the dashed line in FIG. 2. In this way, the evaporator 104 outputs the low-temperature coolant (also referred to as chilled water), and the condenser 102 outputs the high-temperature coolant. The throttling apparatus 103 is configured to control a velocity of the coolant circulating in the closed loop shown by using the dashed line in FIG. 2. The coolant subsystem is connected by using a solid line in FIG. 2. The system includes, but is not limited to, the following components: a first water pump 201 (that is, a condenser branch water pump), a battery pack 202, a power assembly 203, a second water pump 204 (that is, a power assembly branch water pump), a heat exchanger 205, a third water pump 206 (that is, an evaporator branch water pump), a first water tank 207 (for example, an evaporator expansion water tank), a second water tank 208 (for example, a condenser expansion water tank), and a multi-path direction control valve assembly (for example, multi-path direction control valves 301 to 309 in FIG. 2). The first water pump 201, the battery pack 202, the power assembly 203, the second water pump 204, the heat exchanger 205, the third water pump 206, the first water tank 207, and the second water tank 208 are connected by using the multi-path direction control valve assembly, so that the system adjusts opening or closing of each valve port in the multi-path direction control valve assembly to select different circulation manners of the coolant. FIG. 2 shows a connection relationship. The first water tank 207, the second water tank 208, and the battery pack 202 are respectively connected to a left valve port, a lower valve port, and a right valve port of a multi-path direction control valve 301 of the multi-path direction control valve assembly. The first water pump 201, an upper valve port of a multi-path direction control valve 305 of the multi-path direction control valve assembly, and a left valve port of a multi-path direction control valve 303 of the multi-path direction control valve assembly are respectively connected to a left valve port, a lower valve port, and a right valve port of a multi-path direction control valve 302 of the multi-path direction control valve assembly. The battery pack 202 and an upper valve port of a multi-path direction control valve 308 of the multi-path direction control valve assembly are respectively connected to a right valve port and a lower valve port of the multi-path direction control valve 303. The second water tank 208, the power assembly 203, and a right valve port of the multi-path direction control valve 305 are respectively connected to a left valve port, a right valve port, and an upper valve port of a multi-path direction control valve 304 of the multi-path direction control valve assembly. A water inlet of the heat exchanger 205 and an upper valve port of a multi-path direction control valve 309 of the multi-path direction control valve assembly are respectively connected to a left valve port and a lower valve port of the multi-path direction control valve 305. The first water tank 207, the second water tank 208, a water outlet of the heat exchanger 205, and the second water pump 204 are respectively connected to an upper valve port, a left valve port, a right valve port, and a lower valve port of a multi-path direction control valve 306 of the multi-path direction control valve assembly. The power assembly 203, the second water pump 204, and a right valve of a multi-path direction control valve 308 are respectively connected to a right valve port, an upper valve port, and a left valve port of a multi-path direction control valve 307 of the multi-path direction control valve assembly. A right valve port of the multi-path direction control valve 309 is connected to a left valve port of the multi-path direction control valve 308. The third water pump 206 is connected to a left valve port of the multi-path direction control valve 309.

It should be noted that in some implementations, the multi-path direction control valve assembly in the system may include fewer or more multi-path direction control valves. Alternatively, functions of several multi-path direction control valves (or other types of adjustment valves) may be used to replace a function of one of the multi-path direction control valves. Alternatively, a function of one multi-path direction control valve may be used to be replaced with functions of several multi-path direction control valves (or other types of adjustment valves). This embodiment does not limit a type of a multi-path direction control valve and a quantity of multi-path direction control valves included in the multi-path direction control valve assembly. All other components or modules that can implement functions similar to those of the multi-path direction control valve assembly in this embodiment belong to the multi-path direction control valve described in this embodiment. The multi-path direction control valves 301 to 309 in FIG. 2 are merely examples.

In the foregoing implementation, the coolant subsystem connects the battery pack 202, the power assembly 203, the heat exchanger 205, the first water pump 201, the second water pump 204, the third water pump 206, the first water tank 207, and the second water tank 208 by using the multi-path direction control valve assembly, so that the system can adjust opening or closing of each valve port in the multi-path direction control valve assembly to select different circulation manners of the coolant. Heat management manners are provided for different heat management requirements, to reduce energy consumption and costs generated when the system performs heat management on the power assembly and the battery pack.

Figure 3:
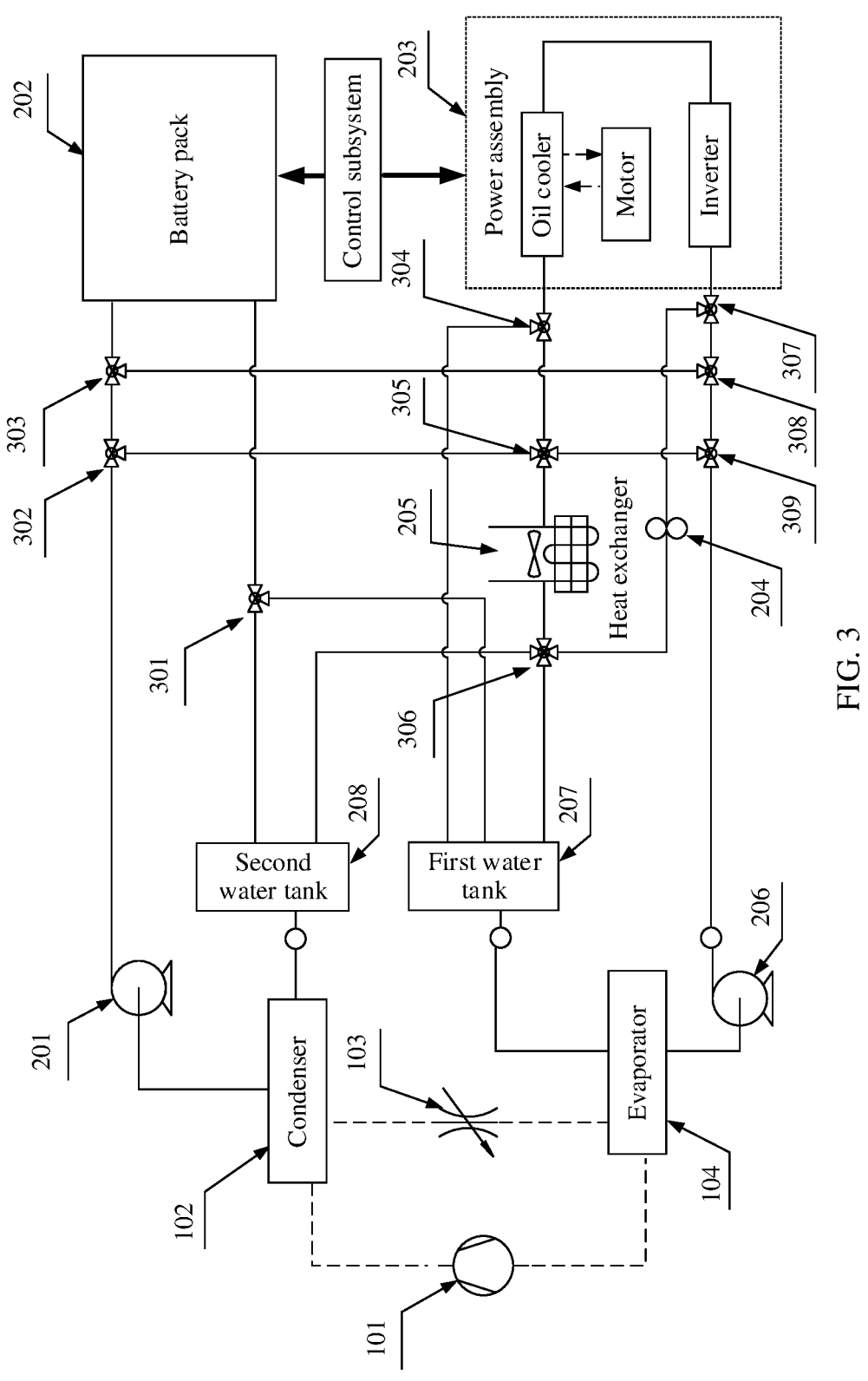
FIG. 3 is a schematic diagram of another frame structure of a heat management system.

It should be noted that, in some implementations, the system may further include a control subsystem. With reference to FIG. 3, the control subsystem controls the multi-path direction control valve assembly to implement circulation of the coolant among the condenser 102, the evaporator 104, the battery pack 202, the power assembly 203, the heat exchanger 205, the first water pump 201, the second water pump 204, the third water pump 206, the first water tank 207, and the second water tank 208. The multi-path direction control valve assembly includes the plurality of multi-path direction control valves. The multi-path direction control valves may be in different types such as a two-path direction control valve, a three-path direction control valve, and a four-path direction control valve. Different types of multi-path direction control valves also have different quantities of valves. Therefore, the control subsystem can control opening or closing of each valve port to select different circulation manners of the coolant. This includes, but is not limited to, the following manners.

a. The multi-path direction control valve assembly is controlled to implement three-path circulation of the coolant. The coolant on a first path of the three-path circulation is output from the condenser; sequentially flows through the first water pump, the heat exchanger, and the second water tank; and then is input to the condenser. The coolant on a second path of the three-path circulation is output from the condenser; sequentially flows through the first water pump, the heat exchanger, the second water pump, and the power assembly; and then is input to the condenser. The coolant on a third path of the three-path circulation is output from the evaporator; sequentially flows through the third water pump, the battery pack, and the first water tank; and then is input to the evaporator.

b. The multi-path direction control valve assembly is controlled to implement the following process in which the coolant is output from the condenser; sequentially flows through the first water pump, the battery pack, the first water tank, the evaporator, the third water pump, the power assembly, the heat exchanger, and the second water tank; and then is input to the condenser.

c. The multi-path direction control valve assembly is controlled to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the heat exchanger, the second water pump, the power assembly, and the first water tank; and then is input to the evaporator.

d. The multi-path direction control valve assembly is controlled to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the power assembly, and the first water tank; and then is input to the evaporator.

e. The multi-path direction control valve assembly is controlled to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the power assembly, the heat exchanger, and the first water tank; and then is input to the evaporator.

f. The multi-path direction control valve assembly is controlled to implement two-path circulation of the coolant. The coolant on a first path of the two-path circulation is output from the condenser; sequentially flows through the first water pump, the battery pack, and the second water tank; and then is input to the condenser. The coolant on a second path of the two-path circulation is output from the evaporator; sequentially flows through the third water pump, the heat exchanger, and the first water tank; and then is input to the evaporator.

In some implementations, the system further includes a sensing subsystem configured to obtain a heat parameter of a target object. The target object includes one or more of an environment in which the system is located, the battery pack, and the power assembly. In this case, the control subsystem is further configured to: receive the heat parameter sent by the sensing subsystem, and control, based on the heat parameter, opening or closing of a valve port of each multi-path direction control valve of the multi-path direction control valve assembly.

It should be noted that, in some implementations, the sensing subsystem includes, but is not limited to, the following components (with reference to FIG. 4): a first sensor 401 (for example, a temperature sensor configured to sense a first temperature of the battery pack 202), a second sensor 402 (for example, a heat sensor configured to sense a heat value generated when the power assembly 203 is in different operation states), and a third sensor 403 (for example, a temperature sensor configured to sense a second temperature of the environment in which the system is located). The sensing subsystem is configured to obtain the heat parameter (for example, the temperature or the heat value) of the target object (for example, the battery pack 202, the power assembly 203, or the environment in which the system is located). It should be further noted that the control subsystem may be further configured to: obtain a current operating condition (for example, a normally driving condition, a fast charging request, or a start condition) of the electric vehicle configured with the system, and control, based on the obtained heat parameter of the target object, the coolant subsystem to perform a corresponding heat management manner of the electric vehicle under the current operating condition. A control manner may be adjusting opening or closing of each path of the multi-path direction control valve assembly (that is, the multi-path direction control valves 301 to 309 in FIG. 4) to control a flow direction of the coolant in the entire system.

Figure 4:
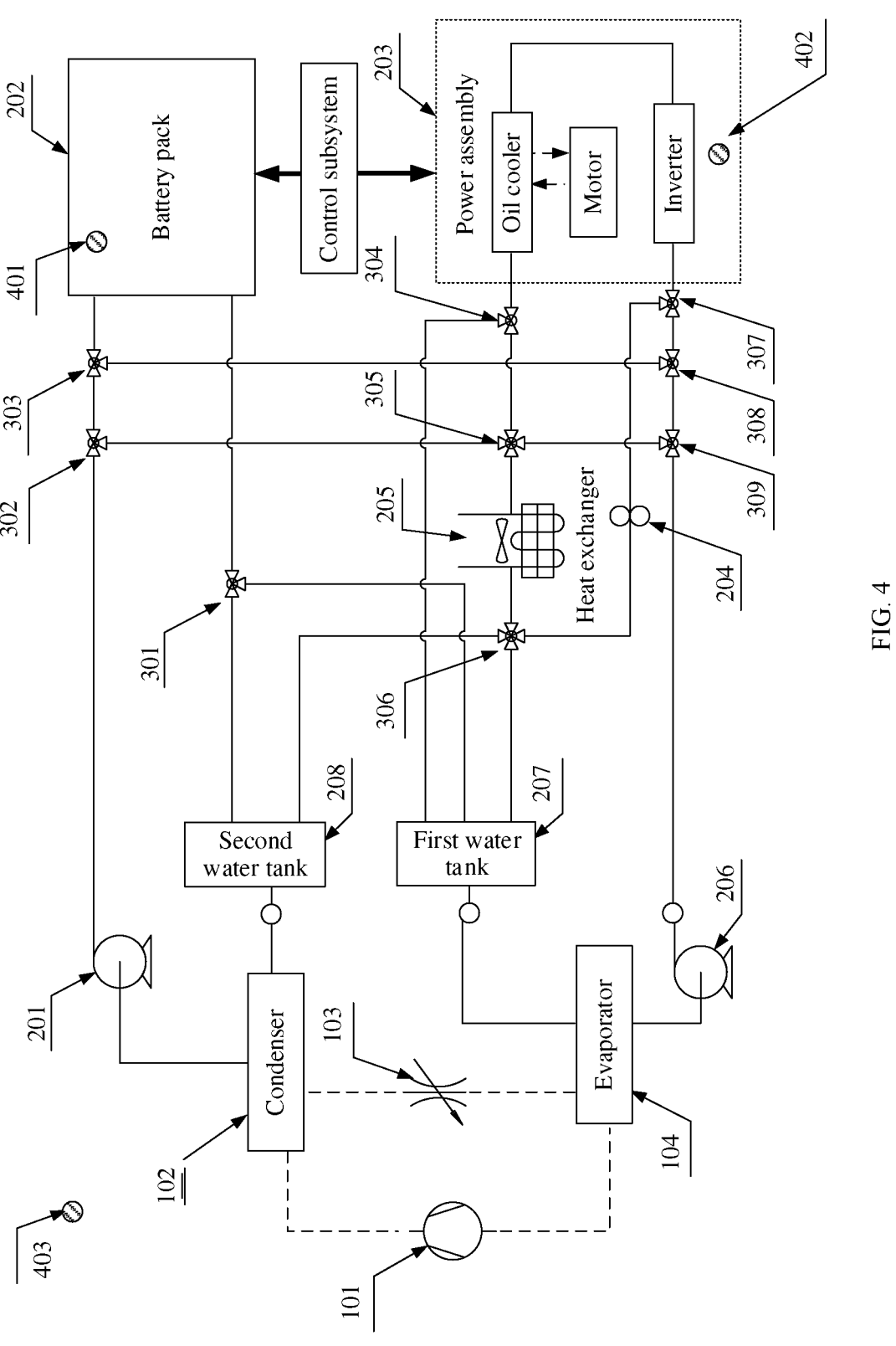
FIG. 4 is a schematic diagram of another frame structure of a heat management system.

For ease of understanding, based on a system structure framework corresponding to FIG. 4, how to implement different coolant circulation manners in the same system structure framework is described when the electric vehicle configured with the system is under different operating conditions and different heat parameters are obtained for the target object.

1. A current operating condition is driving. The sensing subsystem is configured to obtain the heat parameter of the target object, which includes obtaining the first temperature of the battery pack 202 and the second temperature of the environment in which the electric vehicle is located.

With reference to FIG. 4, if the system uses the control subsystem to obtain the current operating condition of the electric vehicle as driving (for example, the normally driving state), the system further obtains the first temperature (which may be denoted as $T_{401}$) of the battery pack 202 by using the first sensor 401; and obtains, by using the third sensor 403, the second temperature (which may be denoted as $T_{403}$) of the environment in which the system is located. After the system obtains $T_{401}$ and $T_{403}$, the system separately compares $T_{401}$ with a first preset temperature (which may be denoted as $T_a$) preset in the system and compares $T_{403}$ with a second preset temperature (which may be denoted as $T_0$) preset in the system.

A. If $T_{401}>T_a$ and $T_{403}>T_0$, the system controls the multi-path direction control valve assembly to implement a coolant circulation manner of air condition cooling of the battery pack 202 and natural heat dissipation of the power assembly.

If a comparison result of the system is $T_{401}>T_a$ and $T_{403}>T_0$, it indicates that the system determines that the battery pack 202 needs to be cooled, and the temperature of the environment in which the electric vehicle is located in a current phase is excessively high (for example, an ambient temperature is relatively high in summer). This cannot meet a requirement for natural heat dissipation of the battery pack 202. Therefore, the battery pack 202 uses an air condition cooling manner. Because a current operating condition of the electric vehicle is the normally driving state, a heat value generated when the power assembly 203 operates is not very high. Therefore, the power assembly 203 uses the natural heat dissipation manner. In conclusion, when $T_{401}>T_a$ and $T_{403}>T_0$, the system controls the multi-path direction control valve assembly to implement a coolant circulation manner of the air conditioning of the battery pack 202 and the natural heat dissipation of the power assembly.

Figure 5:
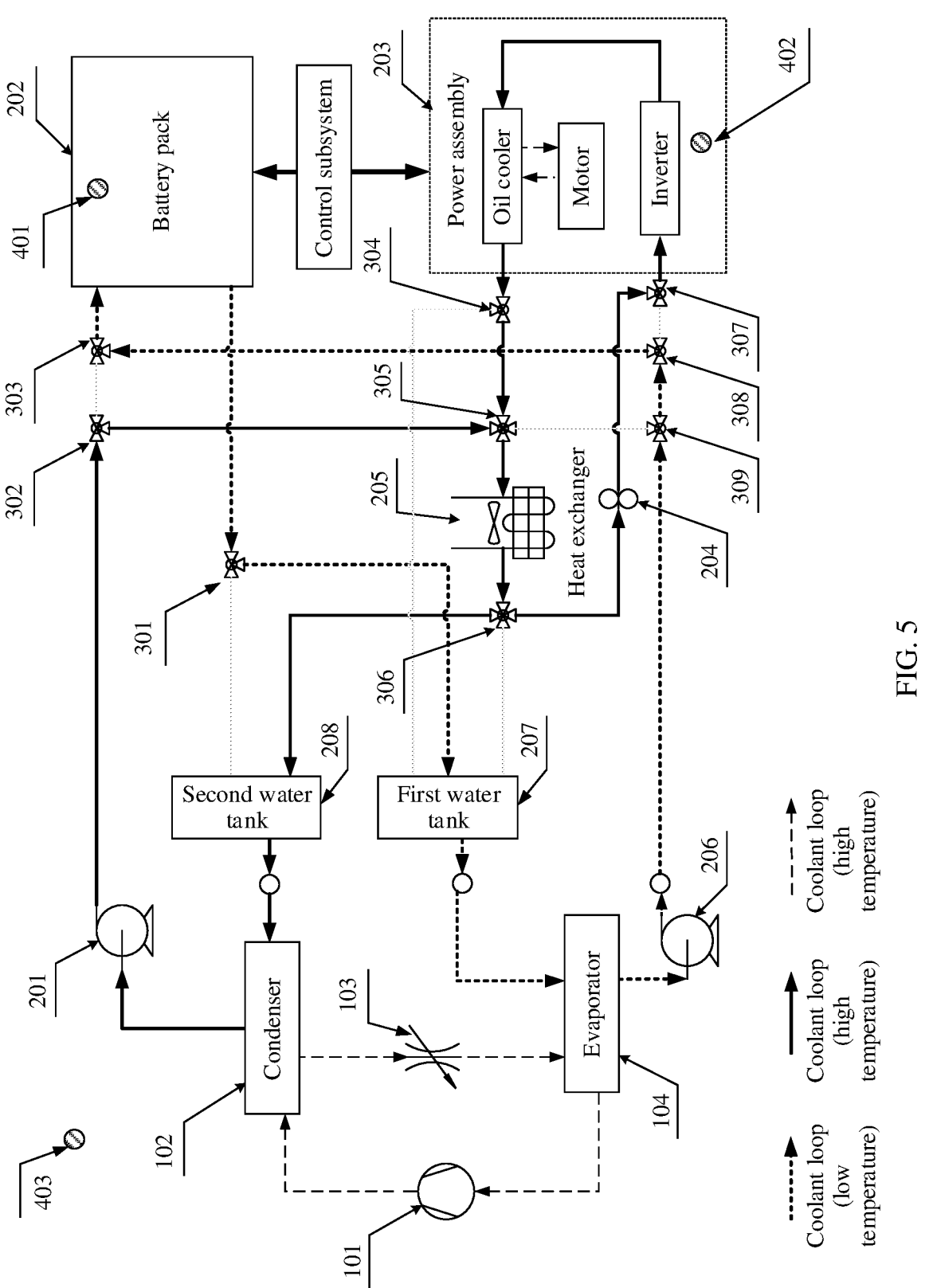
FIG. 5 is a schematic diagram of a coolant circulation manner.

The system adjusts opening and closing of each valve port in the multi-path direction control valve assembly according to a logical manner in Table 1, to form a coolant circulation manner indicated by using an arrow in FIG. 5.

TABLE 1

| | Left valve port | Upper valve port | Right valve port | Lower valve port |
|---|---|---|---|---|
| Multi-path direction control valve 301 | Closed | — | Open | Open |
| Multi-path direction control valve 302 | Open | — | Open | Closed |
| Multi-path direction control valve 303 | Closed | — | Open | Open |
| Multi-path direction control valve 304 | Open | — | Open | Closed |
| Multi-path direction control valve 305 | Open | Open | Open | Closed |
| Multi-path direction control valve 306 | Closed | Open | Open | Open |
| Multi-path direction control valve 307 | Closed | Open | Open | — |
| Multi-path direction control valve 308 | Open | Open | Closed | — |
| Multi-path direction control valve 309 | Open | Closed | Open | — |

The following describes the coolant circulation manner indicated by using the arrow in FIG. 5. When the compressor 101 operates, the compressor 101 in an operating state enables the evaporator 104 to output the low-temperature coolant. In other words, the evaporator 104 refrigerates the coolant under an operation of the compressor 101, and then pumps the low-temperature (lower than an ambient temperature) coolant to the battery pack 202 under an operation of the third water pump 206, to implement the air condition cooling manner of the battery pack 202. In addition, the condenser 102 releases heat generated by the vapor compression circulation subsystem to the coolant. Heat of the high-temperature (higher than the ambient temperature) coolant is released to incoming air in the heat exchanger 205 under the operation of the first water pump 201. In addition, heat generated in a driving process of the power assembly 203 is also released to the coolant. Under an operation of the second water pump 204, heat of the high-temperature coolant is released to the incoming air in the heat exchanger 205 after circulation, to implement the natural heat dissipation manner of the power assembly through the environment.

In conclusion, in the coolant circulation manner, actively cooling (that is, air condition cooling) of the evaporator 104 in the vapor compression circulation subsystem is implemented by using the battery pack 202. Heat management with low power consumption is implemented for the heat generated by the power assembly 203 and the heat of the condenser 102 in the natural heat dissipation manner of the heat exchanger 205.

B. If $T_{401}>T_a$ and $T_{403}<T_0$, the system controls the multi-path direction control valve assembly to implement a coolant circulation manner of natural heat dissipation after the battery pack 202 is connected to the power assembly in series.

Similarly, when the current ambient temperature is relatively low, if a comparison result of the system is $T_{401}>T_a$ and $T_{403}<T_0$, it indicates that the system determines that the battery pack 202 needs to be cooled, and the temperature of the conventional environment in a current phase is relatively low (for example, an ambient temperature is relatively low in winter). This can meet a requirement for natural heat dissipation of the battery pack 202. In addition, because a current operating condition of the electric vehicle is the normally driving state, a heat value generated when the power assembly 203 operates is not very high. Therefore, the power assembly 203 uses the natural heat dissipation manner. In conclusion, when $T_{401}>T_a$ and $T_{403}<T_0$, the system controls the multi-path direction control valve assembly to implement a coolant circulation manner of the natural heat dissipation when the battery pack 202 is connected to the power assembly in series.

The system adjusts opening and closing of each valve port in the multi-path direction control valve assembly according

15

Figure 6:
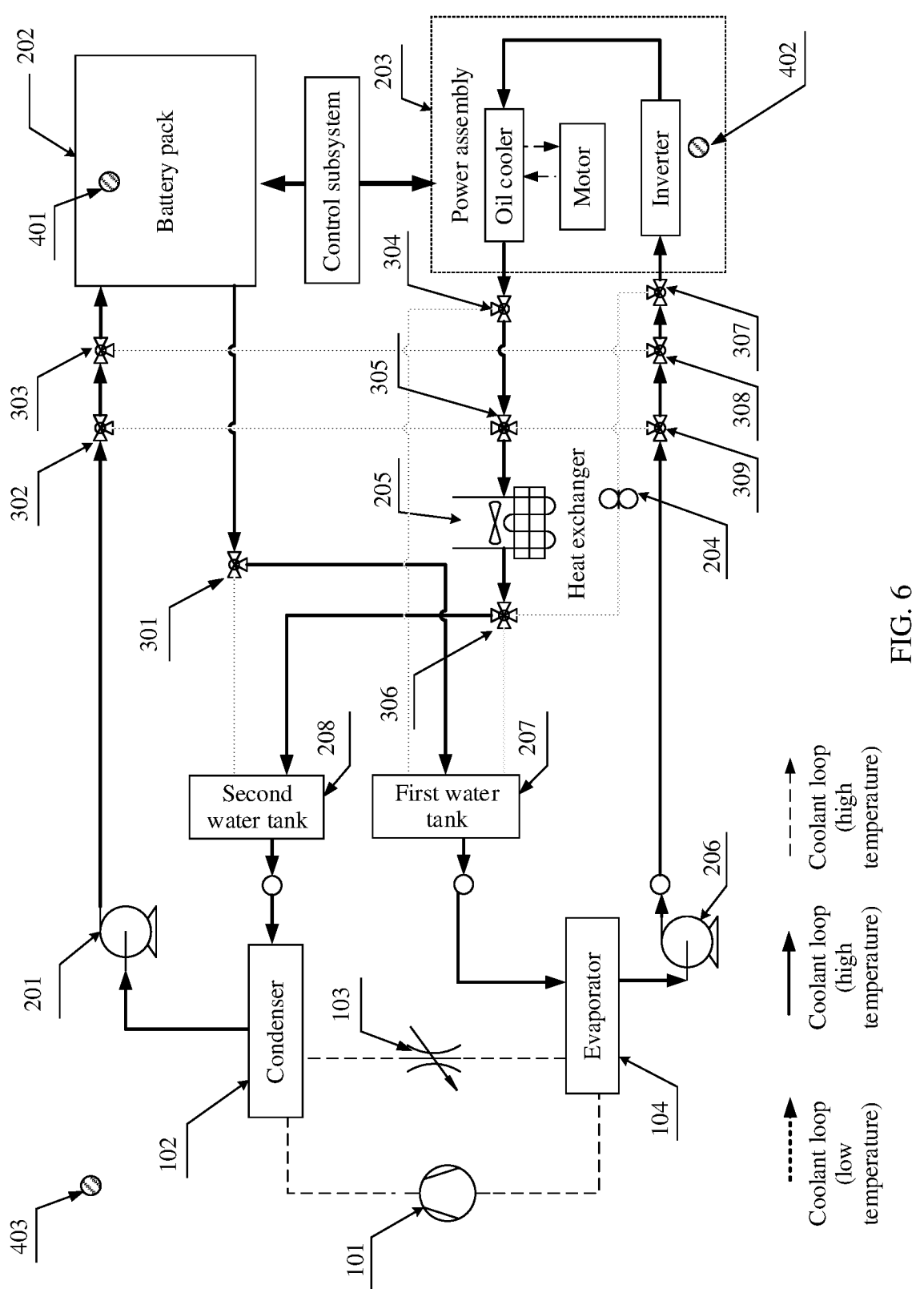
FIG. 6 is a schematic diagram of another coolant circulation manner.

16 to a logical manner in Table 2, to form a coolant circulation manner indicated by using an arrow in FIG. 6.

TABLE 2

| | Left valve port | Upper valve port | Right valve port | Lower valve port |
|---|---|---|---|---|
| Multi-path direction control valve 301 | Closed | — | Open | Open |
| Multi-path direction control valve 302 | Open | — | Open | Closed |
| Multi-path direction control valve 303 | Open | — | Open | Closed |
| Multi-path direction control valve 304 | Open | — | Open | Closed |
| Multi-path direction control valve 305 | Open | Closed | Open | Closed |
| Multi-path direction control valve 306 | Closed | Open | Open | Closed |
| Multi-path direction control valve 307 | Open | Closed | Open | — |
| Multi-path direction control valve 308 | Open | Closed | Open | — |
| Multi-path direction control valve 309 | Open | Closed | Open | — |

The following describes the coolant circulation manner indicated by using the arrow in FIG. 6. Because a tolerant temperature range of the power assembly 203 is relatively high, after the coolant is cooled by using the incoming air in the heat exchanger 205 under an operation of the third water pump 206 and the first water pump 201, a temperature of the coolant is close to the ambient temperature, and then the coolant close to the ambient temperature is pumped to the battery pack 202 to take away the heat generated by the battery pack 202, to implement the natural heat dissipation manner of the battery pack 202. The coolant with a rising temperature is then pumped to the power assembly 203 under the operation of the third water pump 206, takes away the heat generated by the power assembly 203 in the driving state, and then is sent back to the heat exchanger 205. Finally, the coolant delivers the heat to the incoming air by using the heat exchanger 205. The temperature of the coolant is decreased to the temperature close to the ambient temperature, and then enters the foregoing circulation.

In conclusion, in this coolant circulation manner, because the ambient temperature can meet the requirement for the natural heat dissipation of the battery pack 202, the compressor 101 in the vapor compression circulation subsystem does not need to operate, and the evaporator 104 and the condenser 102 do not heat or cool the coolant flowing through the evaporator 104 and the condenser 102. Because the compressor 101 is in a non-operating state, the system does not need to generate extra power consumption for the compressor 101, to implement the heat management with low power consumption for the battery pack 202 and the power assembly 203.

In addition, if the system determines that $T_{401} <$ a third preset temperature (which may be denoted as $T_c$), the system further needs to obtain a heat value (which may be denoted as Q) of the power assembly. Different Q and different $T_{403}$ correspond to different coolant circulation manners. This is shown as follows.

A. If $Q <$ a first preset value (may be denoted as Q1) and $T_{403} > T_0$, the system controls the multi-path direction control valve assembly to implement a coolant circulation manner of heating of the battery pack, heat absorption of the heat exchanger from the environment, and natural heat dissipation of the power assembly.

When a current operating condition of the electric vehicle is driving, Q (for example, the control subsystem obtains information such as a rotation speed, input power, and a torque of the power assembly in real time and determines Q of the power assembly based on the information) of the power assembly is obtained in real time by using the control subsystem. Because $T_{401} < T_c$, the system determines that the battery pack needs to be heated for driving. In this case, if the system determines that $Q < Q1$ and $T_{403} > T_0$, the system further determines that the heat generated by the power assembly is excessively low in the current phase and needs to absorb extra heat from the environment. In this case, the system controls the multi-path direction control valve assembly to implement a coolant circulation manner of heating of the battery pack, heat absorption of the heat exchanger from the environment, and natural heat dissipation of the power assembly.

Figure 7:
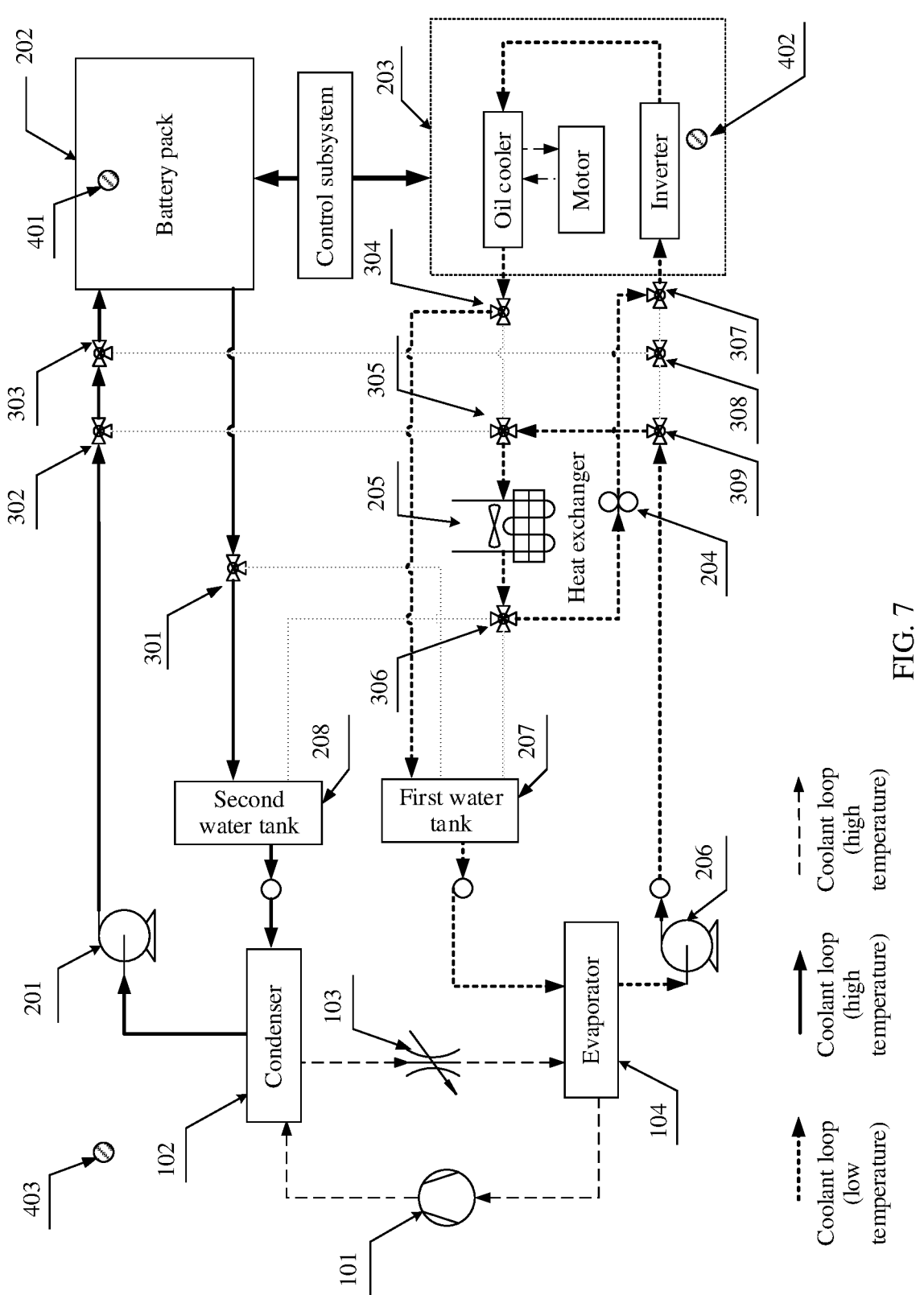
FIG. 7 is a schematic diagram of another coolant circulation manner.

The system adjusts opening and closing of each valve port in the multi-path direction control valve assembly according to a logical manner in Table 3, to form a coolant circulation manner indicated by using an arrow in FIG. 7.

TABLE 3

| | Left valve port | Upper valve port | Right valve port | Lower valve port |
|---|---|---|---|---|
| Multi-path direction control valve 301 | Open | — | Open | Closed |
| Multi-path direction control valve 302 | Open | — | Open | Closed |
| Multi-path direction control valve 303 | Open | — | Open | Closed |
| Multi-path direction control valve 304 | Open | — | Closed | Open |
| Multi-path direction control valve 305 | Open | Closed | Closed | Open |
| Multi-path direction control valve 306 | Closed | Closed | Open | Open |
| Multi-path direction control valve 307 | Closed | Open | Open | — |
| Multi-path direction control valve 308 | Any | Any | Any | — |
| Multi-path direction control valve 309 | Open | Open | Closed | — |

The following describes the coolant circulation manner indicated by using the arrow in FIG. 7. The compressor 101 operates. The battery pack 202 is heated by using a heat pump under an operation of the compressor 101. The high-temperature coolant flowing from the condenser 102 may enter the battery pack 202 to heat the battery pack 202. Then, the coolant flows back to the condenser 102 through the second water tank 208. When a heat load of the power assembly 203 is relatively small (which indicates that a requirement for the heat dissipation of the power assembly 203 is not high, that is, $Q < Q1$ is met), the heat generated by the power assembly 203 is not large. It is assumed that the power assembly 203 generates only 200-watt heat, and the evaporator 104 needs to absorb 500-watt heat to keep the coolant consistent with the ambient temperature. In this way, the evaporator 104 takes away 200-watt heat from the power assembly 203, and further takes away 300-watt heat generated in the environment from the heat exchanger 205. In other words, after the low-temperature coolant flowing from the evaporator 104 absorbs heat from the environment, the coolant is pumped to the power assembly 203 under an operation of the second water pump 204, absorbs heat in the power assembly to be heated, and then enters the evaporator 104 again. In comparison with the mode of the coolant circulation manner corresponding to FIG. 6, in the coolant circulation manner corresponding to FIG. 7, after the coolant enters the evaporator 104, the temperature of the coolant rises. Therefore, energy efficiency of the vapor compression circulation subsystem is increased, and heat consumption of the heat pump is decreased, to save energy.

B. If $Q1 < Q <$ a second preset value (may be denoted as Q2) and $T_{403} < T_0$, the system controls the multi-path direction control valve assembly to implement a coolant circulation manner of heating of the battery pack and natural heat dissipation of the power assembly.

Similarly, when a current operating condition of the electric vehicle is driving, Q (for example, the control subsystem obtains information such as a rotation speed, input power, and a torque of the power assembly in real time and determines Q of the power assembly based on the information) of the power assembly is obtained in real time by using the control subsystem. Because $T_{401}<T_c$, the system determines that the battery pack needs to be heated for driving. In this case, if the system determines that $Q1<Q<Q2$ and $T_{403}<T_0$, the system further determines that the heat generated by the power assembly in the current phase is sufficient for heating of the heat pump of the battery pack 202. In this case, the low-temperature coolant flowing from the evaporator 104 does not need to absorb extra heat from the environment. In this case, the system controls the multi-path direction control valve assembly to implement a coolant circulation manner of heating of the battery pack and natural heat dissipation of the power assembly.

Figure 8:
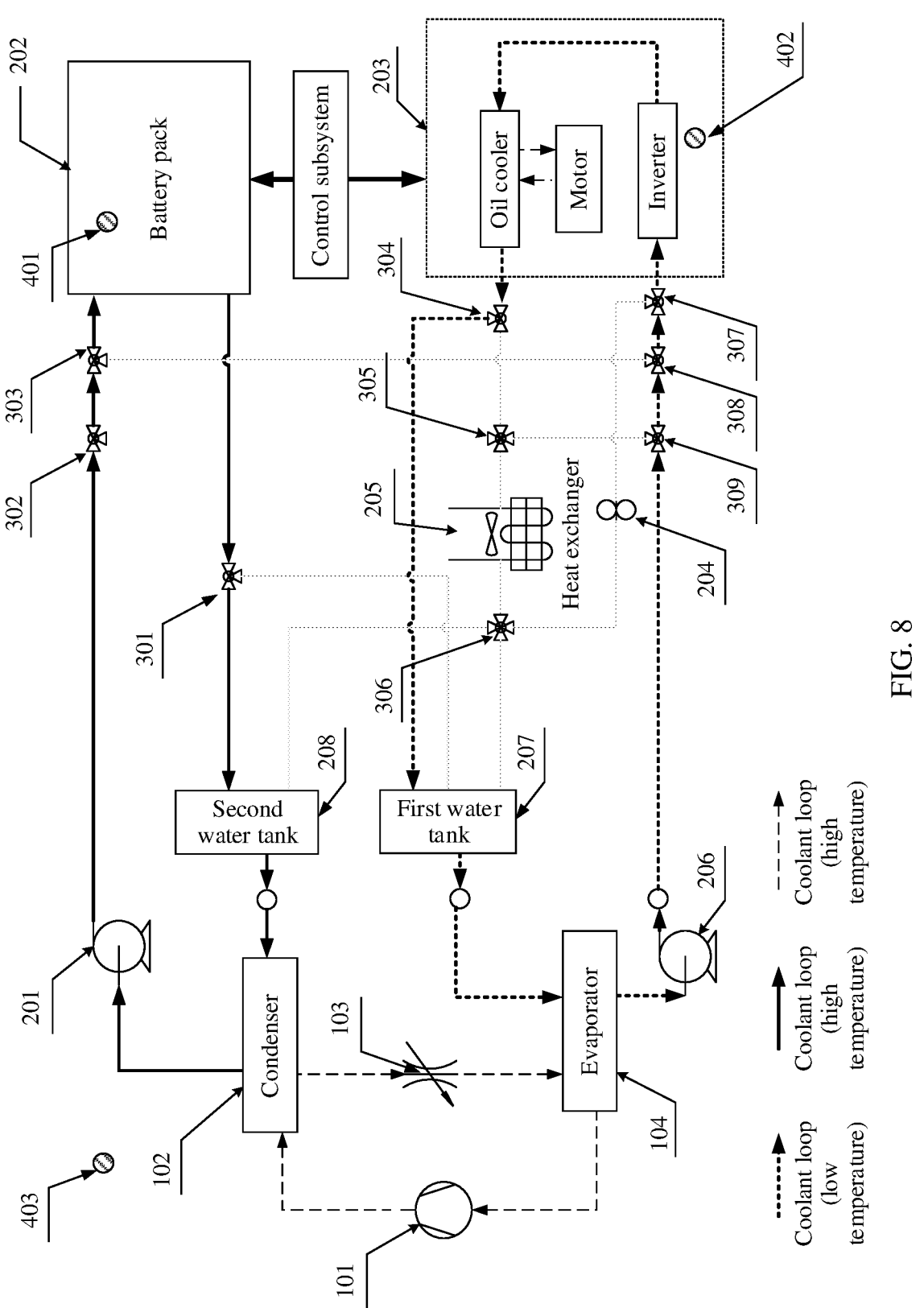
FIG. 8 is a schematic diagram of another coolant circulation manner.

The system adjusts opening and closing of each valve port in the multi-path direction control valve assembly according to a logical manner in Table 4, to form a coolant circulation manner indicated by using an arrow in FIG. 8.

TABLE 4

| | Left valve port | Upper valve port | Right valve port | Lower valve port |
|---|---|---|---|---|
| Multi-path direction control valve 301 | Open | — | Open | Closed |
| Multi-path direction control valve 302 | Open | — | Open | Closed |
| Multi-path direction control valve 303 | Open | — | Open | Closed |
| Multi-path direction control valve 304 | Closed | — | Open | Open |
| Multi-path direction control valve 305 | Any | Any | Any | Any |
| Multi-path direction control valve 306 | Any | Any | Any | Any |
| Multi-path direction control valve 307 | Open | Closed | Open | — |
| Multi-path direction control valve 308 | Open | Closed | Open | — |
| Multi-path direction control valve 309 | Open | Closed | Open | — |

The following describes the coolant circulation manner indicated by using the arrow in FIG. 8. The compressor 101 operates. The battery pack 202 is heated by using the heat pump under an operation of the compressor 101. In other words, the high-temperature coolant flowing from the condenser 102 enters the battery pack to heat the battery pack, and then the coolant flows back to the condenser 102 through the second water tank 208. When the current operating condition is driving (for example, driving for a long time), the heat value generated by the power assembly 203 is between Q1 and Q2. The heat value sufficiently meets heat required for heat generation of the heat pump of the battery pack 202. The coolant flowing from an outlet of the evaporator 104 is directly sent to the power assembly 203, absorbs heat to be heated, and then is directly sent back to the evaporator 104.

In the coolant circulation manner corresponding to FIG. 8, under an operation of the compressor 101, the battery pack 202 is directly heated by using heat absorbed by the low-temperature coolant from the power assembly 203, to improve energy utilization.

C. If $Q>Q2$, the system controls the multi-path direction control valve assembly to implement a coolant circulation manner of heating of the battery pack and heat absorption of the heat exchanger from the power assembly.

Similarly, when a current operating condition of the electric vehicle is driving, Q (for example, the control subsystem obtains information such as a rotation speed, input power, and a torque of the power assembly in real time and determines Q of the power assembly based on the information) of the power assembly is obtained in real time by using the control subsystem. Because $T_{401}<T_c$, the system determines that the battery pack needs to be heated for driving. If the electric vehicle is currently in an operating condition such as long-time slope climbing or high-speed driving, in this case, Q generated by the power assembly is greater than Q2 and $T_{403}<T_0$. The system further determines that the heat generated by the power assembly is excessively high in the current phase. The generated heat is sufficient for heating of the heat pump of the battery pack 202. In addition, a part of the heat needs to be released to the environment by using the heat exchanger. In this case, the system controls the multi-path direction control valve assembly to implement a coolant circulation manner of heating the battery pack and heat absorption of the heat exchanger from the power assembly.

Figure 9:
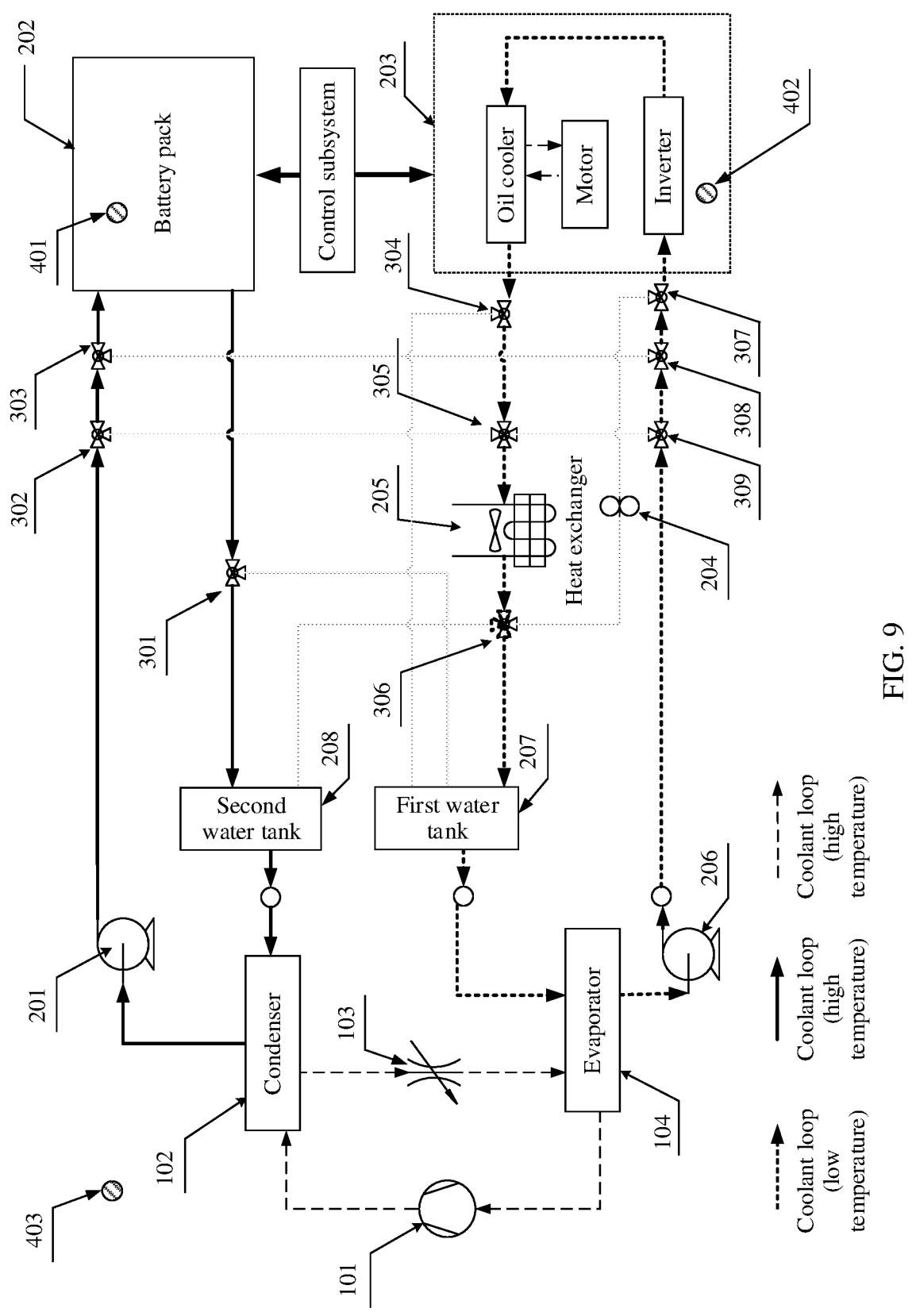
FIG. 9 is a schematic diagram of another coolant circulation manner.

The system adjusts opening and closing of each valve port in the multi-path direction control valve assembly according to a logical manner in Table 5, to form a coolant circulation manner indicated by using an arrow in FIG. 9.

TABLE 5

| | Left valve port | Upper valve port | Right valve port | Lower valve port |
|---|---|---|---|---|
| Multi-path direction control valve 301 | Open | — | Open | Closed |
| Multi-path direction control valve 302 | Open | — | Open | Closed |
| Multi-path direction control valve 303 | Open | — | Open | Closed |
| Multi-path direction control valve 304 | Open | — | Open | Closed |
| Multi-path direction control valve 305 | Open | Closed | Open | Closed |
| Multi-path direction control valve 306 | Open | Closed | Open | Closed |
| Multi-path direction control valve 307 | Open | Closed | Open | — |
| Multi-path direction control valve 308 | Open | Closed | Open | — |
| Multi-path direction control valve 309 | Open | Closed | Open | — |

The following describes the coolant circulation manner indicated by using the arrow in FIG. 9: The compressor 101 operates. The battery pack 202 is heated by using the heat pump under an operation of the compressor 101. In other words, the high-temperature coolant flowing from the condenser 102 enters the battery pack to heat the battery pack, and then the coolant flows back to the condenser 102 through the second water tank 208. However, when a current operating condition is driving (for example, abnormally driving such as long-time slope climbing or high-speed driving), in this case, the heat value generated by the power assembly 203 is greater than Q2. The generated heat is sufficient for heating of the heat pump of the battery pack 202. In addition, a part of the extra heat needs to be released to the environment by using the heat exchanger 205. The coolant flowing from an outlet of the evaporator 104 is directly sent to the power assembly 203 and absorbs heat to be heated. Then, the heated coolant (the temperature is higher than the ambient temperature) flows through the heat exchanger 205, to lower the temperature of the coolant to the ambient temperature. Afterwards, the coolant is sent back to the evaporator 104. If the extra heat of the coolant from the power assembly 203 is not released to the environment by using the heat exchanger 205, the high-temperature coolant flowing from the power assembly 203 directly flows to the evaporator 104. Consequently, a service life of the vapor compression circulation subsystem is shortened. The high-temperature coolant even damages a related component in the vapor compression circulation subsystem.

In a heat management circulation branch corresponding to FIG. 9, under an operation of the compressor 101, the coolant flowing from the evaporator 104 absorbs the heat of the power assembly 203 to be heated. Then, the coolant releases the extra heat to the environment through the heat exchanger 205. Afterwards, the coolant with a temperature consistent with the ambient temperature flows back to the evaporator 104, to reduce power consumption for heating of the heat pump and prolong a service life of the vapor compression circulation subsystem.

2. A current operating condition is a charge request or a start request. The sensing subsystem is further configured to obtain a heat parameter of a target object, including a first temperature of the battery pack.

With reference to FIG. 4, if the system determines, by using the control subsystem, that the current operating condition of the electric vehicle is the charge request or the start request (for example, a request for fast charging or a request for starting the electric vehicle), the system further obtains the first temperature (that is, $T_{401}$) of the battery pack 202 by using the first sensor 401. In this case, the temperature of the environment in which the electric vehicle is located does not need to be obtained. Herein, $T_{401}$ only needs to be compared with a value of a fourth preset temperature (may be denoted as $T_b$). If $T_{401}<T_b$, the system determines that the battery pack needs to be heated before charging or starting (for example, it is assumed that $T_b=8°$ C.; and in this case, $T_{401}$ is lower than 8° C. because the battery pack 202 is in the environment when the ambient temperature in winter is lower than 8° C., and the battery pack 202 needs to be heated). In addition, when the electric vehicle is being charged or started, the power assembly has not generated extra heat (for example, the electric vehicle cannot be driven in the charging process, and the power assembly generates no heat when the electric vehicle is not driven). In this case, the system controls the multi-path direction control valve assembly to implement a coolant circulation manner of heating the battery pack to the fourth preset temperature and heat absorption of the heat exchanger from the environment.

Figure 10:
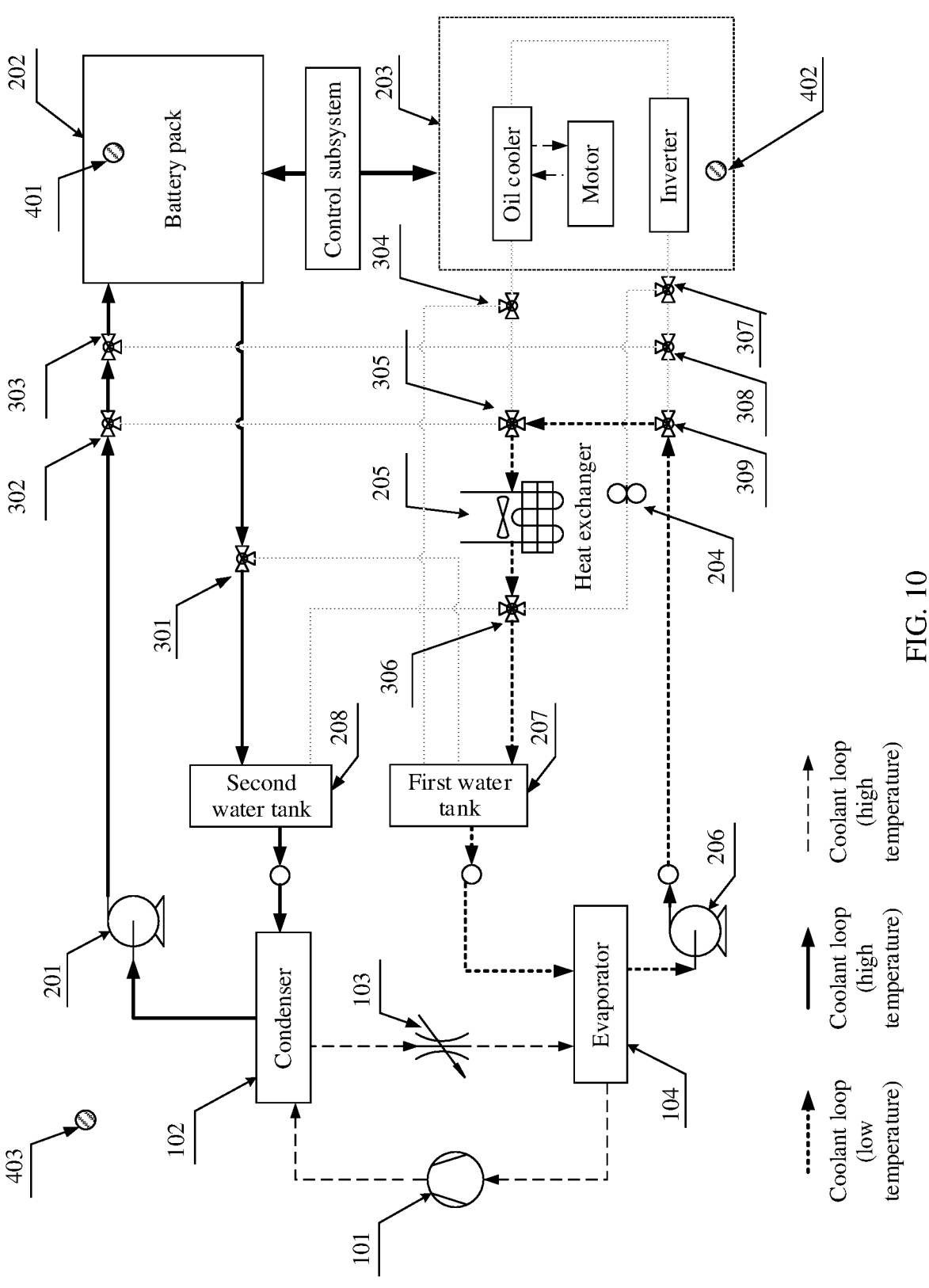
FIG. 10 is a schematic diagram of another coolant circulation manner.

The system adjusts opening and closing of each valve port in the multi-path direction control valve assembly according to a logical manner in Table 6, to form a coolant circulation manner indicated by using an arrow in FIG. 10.

TABLE 6

|  | Left valve port | Upper valve port | Right valve port | Lower valve port |
|---|---|---|---|---|
| Multi-path direction control valve 301 | Open | — | Open | Closed |
| Multi-path direction control valve 302 | Open | — | Open | Closed |
| Multi-path direction control valve 303 | Open | — | Open | Closed |
| Multi-path direction control valve 304 | Any | — | Any | Any |
| Multi-path direction control valve 305 | Open | Closed | Closed | Open |
| Multi-path direction control valve 306 | Open | Closed | Open | Closed |
| Multi-path direction control valve 307 | Any | Any | Any | — |
| Multi-path direction control valve 308 | Any | Any | Any | — |
| Multi-path direction control valve 309 | Open | Open | Closed | — |

The following describes the coolant circulation manner indicated by using the arrow in FIG. 10. The compressor 101 operates. The battery pack 202 is heated by using the heat pump under the operation of the compressor 101. In other words, the high-temperature high-pressure coolant in the condenser 102 releases heat in condensation. The coolant flowing through the condenser 102 is heated. The heated coolant is pumped to the battery pack 202 to heat the battery pack 202 under an operation of the first water pump 201. Then, the coolant flows from the battery pack 202, and flows back to the condenser 102 through the second water tank 208. Afterwards, the coolant releasing the heat flows from the condenser 102 and is converted to the low-temperature low-pressure coolant in a vapor-liquid state after passing through the throttling apparatus 103. The low-temperature low-pressure coolant enters the evaporator 104, absorbs heat and is evaporated into supper-heated vapor, and then returns to the compressor. When the current operating condition is a charge request or a start request (which indicates that the power assembly 203 does not operate in this case), in this case, the power assembly 203 does not generate extra heat. Under the operation of the third water pump 206, the coolant enters the evaporator 104, and releases heat. After the coolant releases the heat, the temperature of the coolant falls below the ambient temperature. The low-temperature coolant enters the heat exchanger 205, absorbs the heat in the environment and is heated (in this case, the temperature of the coolant is consistent with the ambient temperature), and then enters the evaporator 104 again to continue to release heat to the low-temperature coolant.

In the coolant circulation manner corresponding to FIG. 10, under an operation of the compressor 101, the battery pack 202 is directly heated by using the high-temperature coolant. Because the power assembly 203 does not operate, the low-temperature coolant flows from the evaporator 104, absorbs the heat in the environment, and flows back to the evaporator 104, to improve energy utilization.

In the foregoing implementation, the first preset temperature $T_a$, the second preset temperature $T_0$, the third preset temperature $T_c$, the fourth preset temperature $T_b$, the first preset value Q1, and the second preset value Q2 may be all set according to a requirement of a user (for example, a driving habit, an overall vehicle condition of an electric vehicle, and a season condition of a current region). This is not limited herein.

In the foregoing implementation, the electric vehicle may determine a proper coolant circulation manner for the current operating condition in real time based on the current operating condition and the obtained heat parameter of the target object, to provide different coolant circulation manners for different heat management requirements of the electric vehicle, thereby reducing power consumption generated when the system performs heat management on the power assembly and the battery pack.

What is claimed is:

1. A heat management system, comprising:
a vapor compression circulation subsystem; and
a coolant subsystem;
wherein
a compressor, a condenser, a throttling apparatus, and an evaporator are comprised in the vapor compression circulation subsystem and are sequentially connected to form a closed loop, to provide a coolant at a preset temperature for circulation in the coolant subsystem; and
a battery pack, a power assembly, a heat exchanger, a first water pump, a second water pump, a third water pump, a first water tank, and a second water tank are comprised in the coolant subsystem and are connected by using a multi-path direction control valve assembly, so that the system adjusts opening or closing of each valve port in the multi-path direction control valve assembly to select different circulation manners of the coolant;
wherein the multi-path direction control valve assembly is configured to implement circulation of the coolant among the condenser, the evaporator, the battery pack, the power assembly, the heat exchanger, the first water pump, the second water pump, the third water pump, the first water tank, and the second water tank; and the multi-path direction control valve assembly is configured to implement the following process in which the coolant is capable of being output from the condenser, sequentially flows through the first water pump, the battery pack, the first water tank, the evaporator, the third water pump, the power assembly, the heat exchanger, and the second water tank, and then is capable of being input to the condenser.

2. The heat management system according to claim 1, wherein the multi-path direction control valve assembly is further configured to implement three-path circulation of the coolant, wherein the coolant on a first path of the three-path circulation is capable of being output from the condenser, sequentially flows through the first water pump, the heat exchanger, and the second water tank, and then is capable of being input to the condenser; the coolant on a second path of the three-path circulation is capable of being output from the condenser, sequentially flows through the first water pump, the heat exchanger, the second water pump, and the power assembly, and then is capable of being input to the condenser; and the coolant on a third path of the three-path circulation is capable of being output from the evaporator, sequentially flows through the third water pump, the battery pack, and the first water tank, and then is capable of being input to the evaporator.

3. The heat management system according to claim 1, wherein the multi-path direction control valve assembly is further configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the heat exchanger, the second water pump, the power assembly, and the first water tank, and then is capable of being input to the evaporator.

4. The heat management system according to claim 1, wherein the multi-path direction control valve assembly is further configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the power assembly, and the first water tank, and then is capable of being input to the evaporator.

5. The heat management system according to claim 1, wherein the multi-path direction control valve assembly is further configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the power assembly, the heat exchanger, and the first water tank, and then is capable of being input to the evaporator.

6. The heat management system according to claim 1, wherein the multi-path direction control valve assembly is further configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the heat exchanger, and the first water tank, and then is capable of being input to the evaporator.

7. The heat management system according to claim 1, wherein the first water tank, the second water tank, and the battery pack are respectively connected to a left valve port, a lower valve port, and a right valve port of a first multi-path direction control valve of the multi-path direction control valve assembly;

the first water pump, an upper valve port of a fifth multi-path direction control valve of the multi-path direction control valve assembly, and a left valve port of a third multi-path direction control valve of the multi-path direction control valve assembly are respectively connected to a left valve port, a lower valve port, and a right valve port of a second multi-path direction control valve of the multi-path direction control valve assembly;

the battery pack and an upper valve port of an eighth multi-path direction control valve of the multi-path direction control valve assembly are respectively connected to a right valve port and a lower valve port of the third multi-path direction control valve;

the second water tank, the power assembly, and a right valve port of the fifth multi-path direction control valve are respectively connected to a left valve port, a right valve port, and an upper valve port of a fourth multi-path direction control valve of the multi-path direction control valve assembly;

a water inlet of the heat exchanger and an upper valve port of a ninth multi-path direction control valve of the multi-path direction control valve assembly are respectively connected to a left valve port and a lower valve port of the fifth multi-path direction control valve;

the first water tank, the second water tank, a water outlet of the heat exchanger, and the second water pump are respectively connected to an upper valve port, a left valve port, a right valve port, and a lower valve port of a sixth multi-path direction control valve of the multi-path direction control valve assembly;

the power assembly, the second water pump, and a right valve of the eighth multi-path direction control valve are respectively connected to a right valve port, an upper valve port, and a left valve port of a seventh multi-path direction control valve of the multi-path direction control valve assembly;

a right valve port of the ninth multi-path direction control valve is connected to a left valve port of the eighth multi-path direction control valve; and the third water pump is connected to a left valve port of the ninth multi-path direction control valve.

8. The heat management system according to claim 7, further comprising:

a sensing subsystem, configured to obtain a heat parameter of a target object, wherein the target object comprises one or more of an environment in which the system is located, the battery pack, or the power assembly, wherein a valve port of each multi-path direction control valve of the multi-path direction control valve assembly is configured to be opened or closed based on the heat parameter.

9. The heat management system according to claim 8, wherein the sensing subsystem is further configured to:

obtain a first temperature of the battery pack and a second temperature of the environment in which the system is located.

10. The heat management system according to claim 9, wherein when the first temperature is greater than a first preset temperature and the second temperature is greater than a second preset temperature, the left valve port, the right valve port, and the lower valve port of the first multi-path direction control valve are configured to respectively be in a closed state, an open state, and the open state;

the left valve port, the right valve port, and the lower valve port of the second multi-path direction control valve are configured to respectively be in the open state, the open state, and the closed state;

the left valve port, the right valve port, and the lower valve port of the third multi-path direction control valve are configured to respectively be in the closed state, the open state, and the open state;

the left valve port, the right valve port, and the lower valve port of the fourth multi-path direction control valve are configured to respectively be in the open state, the open state, and the closed state;

the left valve port, the upper valve port, the right valve port, and the lower valve port of the fifth multi-path direction control valve are configured to respectively be in the open state, the open state, the open state, and the closed state;

the left valve port, the upper valve port, the right valve port, and the lower valve port of the sixth multi-path direction control valve are configured to respectively be in the closed state, the open state, the open state, and the open state;

the left valve port, the upper valve port, and the right valve port of the seventh multi-path direction control valve are configured to respectively be in the closed state, the open state, and the open state;

the left valve port, the upper valve port, and the right valve port of the eighth multi-path direction control valve are configured to respectively be in the open state, the open state, and the closed state; and the left valve port, the upper valve port, and the right valve port of the ninth multi-path direction control valve are configured to respectively be in the open state, the closed state, and the open state.

11. The heat management system according to claim 9, wherein when the first temperature is less than a first preset temperature and the second temperature is greater than a second preset temperature, the left valve port, the right valve port, and the lower valve port of the first multi-path direction control valve are configured to respectively be in a closed state, an open state, and the open state;

the left valve port, the right valve port, and the lower valve port of the second multi-path direction control valve are configured to respectively be in the open state, the open state, and the closed state;

the left valve port, the right valve port, and the lower valve port of the third multi-path direction control valve are configured to respectively be in the open state, the open state, and the closed state;

the left valve port, the right valve port, and the lower valve port of the fourth multi-path direction control valve are configured to respectively be in the open state, the open state, and the closed state;

the left valve port, the upper valve port, the right valve port, and the lower valve port of the fifth multi-path direction control valve are configured to respectively be in the open state, the closed state, the open state, and the closed state;

the left valve port, the upper valve port, the right valve port, and the lower valve port of the sixth multi-path direction control valve are configured to respectively be in the closed state, the open state, the open state, and the closed state;

the left valve port, the upper valve port, and the right valve port of the seventh multi-path direction control valve are configured to respectively be in the open state, the closed state, and the open state;

the left valve port, the upper valve port, and the right valve port of the eighth multi-path direction control valve are configured to respectively be in the open state, the closed state, and the open state; and the left valve port, the upper valve port, and the right valve port of the ninth multi-path direction control valve are configured to respectively be in the open state, the closed state, and the open state.

12. The heat management system according to claim 9, wherein the sensing subsystem is further configured to:

obtain a heat value of the power assembly.

13. The heat management system according to claim 12, wherein when the first temperature is less than a third preset temperature, the second temperature is greater than the second preset temperature, and the heat value is less than a first preset value, the left valve port, the right valve port, and the lower valve port of the first multi-path direction control valve are configured to respectively be in the open state, the open state, and the closed state;

the left valve port, the right valve port, and the lower valve port of the second multi-path direction control valve are configured to respectively be in the open state, the open state, and the closed state;

the left valve port, the right valve port, and the lower valve port of the third multi-path direction control valve are configured to respectively be in the open state, the open state, and the closed state;

the left valve port, the right valve port, and the lower valve port of the fourth multi-path direction control valve are configured to respectively be in the open state, the closed state, and the open state;

the left valve port, the upper valve port, the right valve port, and the lower valve port of the fifth multi-path direction control valve are configured to respectively be in the open state, the closed state, the closed state, and the open state;

the left valve port, the upper valve port, the right valve port, and the lower valve port of the sixth multi-path direction control valve are configured to respectively be in the closed state, the closed state, the open state, and the open state;

the left valve port, the upper valve port, and the right valve port of the seventh multi-path direction control valve are configured to respectively be in the closed state, the open state, and the open state; and the left valve port, the upper valve port, and the right valve port of the ninth multi-path direction control valve are configured to respectively be in the open state, the open state, and the closed state.

14. The heat management system according to claim 12, wherein when the first temperature is less than a third preset temperature, the second temperature is less than the second preset temperature, and the heat value is greater than a first preset value and less than a second preset value, the left valve port, the right valve port, and the lower valve port of the first multi-path direction control valve are configured to respectively be in the open state, the open state, and the closed state;

the left valve port, the right valve port, and the lower valve port of the second multi-path direction control valve are configured to respectively be in the open state, the open state, and the closed state;

the left valve port, the right valve port, and the lower valve port of the third multi-path direction control valve are configured to respectively be in the open state, the open state, and the closed state;

the left valve port, the right valve port, and the lower valve port of the fourth multi-path direction control valve are configured to respectively be in the closed state, the open state, and the open state;

the left valve port, the upper valve port, and the right valve port of the seventh multi-path direction control valve are configured to respectively be in the open state, the closed state, and the open state;

the left valve port, the upper valve port, and the right valve port of the eighth multi-path direction control valve are configured to respectively be in the open state, the closed state, and the open state; and the left valve port, the upper valve port, and the right valve port of the ninth multi-path direction control valve are configured to respectively be in the open state, the closed state, and the open state.

15. The heat management system according to claim 12, wherein when the first temperature is less than a third preset temperature and the heat value is greater than a second preset value, the left valve port, the right valve port, and the lower valve port of the first multi-path direction control valve are configured to respectively be in the open state, the open state, and the closed state;

the left valve port, the right valve port, and the lower valve port of the second multi-path direction control valve are configured to respectively be in the open state, the open state, and the closed state;

the left valve port, the right valve port, and the lower valve port of the third multi-path direction control valve are configured to respectively be in the open state, the open state, and the closed state;

the left valve port, the right valve port, and the lower valve port of the fourth multi-path direction control valve are configured to respectively be in the open state, the open state, and the closed state;

the left valve port, the upper valve port, the right valve port, and the lower valve port of the fifth multi-path direction control valve are configured to respectively be in the open state, the closed state, the open state, and the closed state;

the left valve port, the upper valve port, the right valve port, and the lower valve port of the sixth multi-path direction control valve are configured to respectively be in the open state, the closed state, the open state, and the closed state;

the left valve port, the upper valve port, and the right valve port of the seventh multi-path direction control valve are configured to respectively be in the open state, the closed state, and the open state;

the left valve port, the upper valve port, and the right valve port of the eighth multi-path direction control valve are configured to respectively be in the open state, the closed state, and the open state; and the left valve port, the upper valve port, and the right valve port of the ninth multi-path direction control valve are configured to respectively be in the open state, the closed state, and the open state.

16. An electric vehicle, configured with a heat management system, wherein the heat management system comprises:

a vapor compression circulation subsystem; and a coolant subsystem, wherein a compressor, a condenser, a throttling apparatus, and an evaporator are comprised in the vapor compression circulation subsystem and are sequentially connected to form a closed loop, to provide a coolant at a preset temperature for circulation in the coolant subsystem; and a battery pack, a power assembly, a heat exchanger, a first water pump, a second water pump, a third water pump, a first water tank, and a second water tank are comprised in the coolant subsystem and are connected by using a multi-path direction control valve assembly, so that the system adjusts opening or closing of each valve port in the multi-path direction control valve assembly to select different circulation manners of the coolant;

the multi-path direction control valve assembly is configured to implement circulation of the coolant among the condenser, the evaporator, the battery pack, the power assembly, the heat exchanger, the first water pump, the second water pump, the third water pump, the first water tank, and the second water tank; and the multi-path direction control valve assembly is configured to implement the following process in which the coolant is capable of being output from the condenser, sequentially flows through the first water pump, the battery pack, the first water tank, the evaporator, the third water pump, the power assembly, the heat exchanger, and the second water tank, and then is capable of being input to the condenser.

17. The system according to claim 16, wherein the multi-path direction control valve assembly is configured to implement three-path circulation of the coolant, wherein the coolant on a first path of the three-path circulation is capable of being output from the condenser, sequentially flows through the first water pump, the heat exchanger, and the second water tank, and then is capable of being input to the condenser; the coolant on a second path of the three-path circulation is capable of being output from the condenser, sequentially flows through the first water pump, the heat exchanger, the second water pump, and the power assembly, and then is capable of being input to the condenser; and the coolant on a third path of the three-path circulation is capable of being output from the evaporator, sequentially flows through the third water pump, the battery pack, and the first water tank, and then is capable of being input to the evaporator.

18. The system according to claim 16, wherein the multi-path direction control valve assembly is configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the heat exchanger, the second water pump, the power assembly, and the first water tank, and then is capable of being input to the evaporator.

19. The system according to claim 16, wherein the multi-path direction control valve assembly is configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the power assembly, and the first water tank, and then is capable of being input to the evaporator.

20. The system according to claim 16, wherein the multi-path direction control valve assembly is configured to implement two-path circulation of the coolant, wherein the coolant on a first path of the two-path circulation is capable of being output from the condenser, sequentially flows through the first water pump, the battery pack, and the second water tank, and then is capable of being input to the condenser; and the coolant on a second path of the two-path circulation is capable of being output from the evaporator, sequentially flows through the third water pump, the power assembly, the heat exchanger, and the first water tank, and then is capable of being input to the evaporator.

\* \* \* \* \*